United States Patent
Do et al.

(10) Patent No.: US 10,476,331 B2
(45) Date of Patent: Nov. 12, 2019

(54) ROTOR STRUCTURE OF WRSM MOTOR

(71) Applicant: HYUNDAI MOTOR COMPANY, Seoul (KR)

(72) Inventors: SangHwa Do, Seongnam-si (KR); Jae Bum Park, Suwon-si (KR); Hee Ra Lee, Anyang-si (KR); Kyoungbum Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 176 days.

(21) Appl. No.: 15/585,619

(22) Filed: May 3, 2017

(65) Prior Publication Data

US 2018/0166936 A1    Jun. 14, 2018

(30) Foreign Application Priority Data

Dec. 13, 2016    (KR) .................. 10-2016-0169725

(51) Int. Cl.
| | |
|---|---|
| *H02K 1/24* | (2006.01) |
| *H02K 1/28* | (2006.01) |
| *H02K 3/52* | (2006.01) |
| *H02K 3/32* | (2006.01) |
| *H02K 15/02* | (2006.01) |

(52) U.S. Cl.
CPC .............. *H02K 1/28* (2013.01); *H02K 1/24* (2013.01); *H02K 3/325* (2013.01); *H02K 3/527* (2013.01); *H02K 15/022* (2013.01)

(58) Field of Classification Search
CPC ............ H02K 1/148; H02K 1/24; H02K 1/28; H02K 3/527
See application file for complete search history.

(56) References Cited

U.S. PATENT DOCUMENTS

| | | | | |
|---|---|---|---|---|
| 2,655,613 A * | 10/1953 | Wieseman | ............... | H02K 3/18 310/191 |
| 3,157,806 A * | 11/1964 | Wiedemann | ............. | H02K 3/22 174/DIG. 19 |
| 6,177,751 B1 * | 1/2001 | Suzuki | .................. | H02K 1/148 310/194 |
| 6,717,319 B2 * | 4/2004 | Suzuki | .................. | H02K 1/148 310/216.101 |
| 2004/0046479 A1 * | 3/2004 | Haga | ....................... | H02K 1/24 310/269 |

(Continued)

FOREIGN PATENT DOCUMENTS

| | | |
|---|---|---|
| DE | 102011121793 A1 | 6/2013 |
| GB | 2491573 A | 12/2012 |
| JP | 2005-323477 A | 11/2005 |

(Continued)

OTHER PUBLICATIONS

European Search Report for European Application No. EP 17 17 6577 dated Jan. 26, 2018 (10 pages).

*Primary Examiner* — Dang D Le
(74) *Attorney, Agent, or Firm* — Brinks Gilson & Lione (57) ABSTRACT

The present disclosure provides a rotor of the wound rotor driving motor including: a first core body having an outer surface and an inner surface, wherein the first core body forms a space inside of the first core body; a second core body being inserted into inside of the first core body, wherein the second core body contacts with the inner surface of the first core body; and a coil assembly combined to the second core body in a radial direction.

12 Claims, 4 Drawing Sheets

(56) References Cited

U.S. PATENT DOCUMENTS

2015/0326076 A1* 11/2015 Kim .................. H02K 1/24
    310/216.086
2016/0164374 A1  6/2016 Yang et al.

FOREIGN PATENT DOCUMENTS

| JP | 4700229 B | 6/2011 |
| KR | 10-0585806 B | 6/2006 |
| KR | 10-2017-0060501 A | 6/2017 |

* cited by examiner

ROTOR STRUCTURE OF WRSM MOTOR

CROSS-REFERENCE TO RELATED APPLICATION

The present application claims priority to and the benefit of Korean Patent Application No. 10-2016-0169725, filed on Dec. 13, 2016, which is incorporated herein by reference in its entirety.

FIELD

The present disclosure relates to a wound rotor driving motor. More particularly, the present disclosure relates to a rotor combination structure of a wound rotor driving motor which coil is wound around rotor core.

BACKGROUND

The statements in this section merely provide background information related to the present disclosure and may not constitute prior art.

In general, hybrid vehicles or electric vehicles, which are called environmentally-friendly vehicles, may generate driving power by an electric motor (hereafter, also referred to as a "driving motor") gaining torque from electric energy.

For example, hybrid vehicles travel in an EV (Electric vehicle) mode, which is a pure electric vehicle mode using only the power from a driving motor, or travel in an HEV (Hybrid Electric Vehicle) mode using torque from both of an engine and a driving motor as power. Common electric vehicles travel using torque from a driving motor as power.

Most of the driving motors used for the environmentally-friendly vehicles are PMSMs (Permanent Magnet Synchronous Motor). The PMSMs require to improve the performance of the permanent magnet in order to achieve the enhanced performance under a limited layout condition.

Neodymium (Nd) in the permanent magnet improves the intensity of the permanent magnet and the dysprosium (Dy) improves demagnetization. However, these rare earth metal elements (Nd and Dy) in the permanent magnet are buried under the ground in a limited countries such as China. Thus, the price is very high and frequently fluctuating.

In order to improve those problems, an induction motor has been recently examined, but there are limitations of excessive increase in volume, weight, and size for achieve the same motor performance.

On the other hand, the WRSM that will replace the PMSM has been developed more recently as a driving motor that is used as a power source for environmentally-friendly vehicles.

The WRSM is replaced to the PMSM by electromagnetizing the rotor when applying current by winding a coil around the rotor as well as the stator.

In the WRSM, the rotor is disposed inside a stator with a predetermined gap. A magnetic field is generated when power is applied to the coils of the stator and the rotor, and the rotator is rotated by a magnetic action generated between the stator and the rotor.

Meanwhile, the WRSM winds coils around the rotator, unlike the PMSM. Accordingly, a large centrifugal force is applied to the rotor coil when the rotor rotates by a high speed (above maximum 10,000 rpm in case of usual EV).

Accordingly, in the WRSM, arrangement of the rotor coil is deteriorated or separated by a centrifugal force applied to the rotor coil during the high speed rotation of the rotor, and the rotor core may be damaged due to the concentration to the rotor core around which the rotor coil is wound.

Therefore, mechanical strength supporting a centrifugal force of the rotor coil is gained by inserting a wedge between tee and tee of the rotor core in a conventional art. However, the number of component increases with this conventional method On the other hand, a rotor coil is wound around a bobbin using a nozzle-type winding device after the bobbin is assembled to tee of the rotor of the WRSM in the conventional art.

In the conventional art, since the rotor tees are integrally formed at the rotor core, difficulty in the process arises when the rotor coil is wound around the bobbin by using the nozzle-type winding device. This results in the deterioration of a winding space factor, thereby increasing a copper loss of the motor.

SUMMARY

The present disclosure provides a rotor of wound rotor driving motor in which a rotor core is formed as heterogeneous division body and a wedge supporting the rotor core is integrally formed at the division body, and improving winding operation ability and winding space factor.

A rotor of a wound rotor driving motor in some forms of the present disclosure includes i) a first core body having an outer surface and an inner surface, wherein the first core body forms a space inside of the first core body; ii) a second core body being inserted into an inside of the first core body, wherein the second core body is in contact with the inner surface of the first core body; and iii) a coil assembly combined to the second core body in a radial direction.

In the rotor of a wound rotor driving motor in some forms of the present disclosure, the first core body may be formed as a cylindrical shape, wherein both ends of the first core body are open.

In the rotor of a wound rotor driving motor in some forms of the present disclosure, the second core body may be inserted into inside of the first core body and combined to the coil assembly.

In the rotor of a wound rotor driving motor in some forms of the present disclosure, the coil assembly may include a bobbin combined to the second core body; and a rotor coil wound around the bobbin.

In the rotor of a wound rotor driving motor in some forms of the present disclosure, the coil assembly located close to each other may be insulated by a molding resin.

In the rotor of a wound rotor driving motor in some forms of the present disclosure, the first and second core bodies may include a plurality of laminated iron sheets.

A rotor of a wound rotor driving motor in some forms of the present disclosure includes i) a first core body having an outer surface and an inner surface, wherein the first core boy forms a space inside the first core body, and has rotor shoes connected with each other at a predetermined space along a circumferential direction; ii) a second core body forming a rotor tees, wherein the rotor tees contact with an inside of the rotor shoes in a radial direction, and the second core body is inserted into an inside of the first core body; and iii) a coil assembly combined to the rotor tees of the second core body.

In the rotor of a wound rotor driving motor in some forms of the present disclosure, the first core body may be formed as a cylindrical shape, wherein both ends of the first core body are open, and the second core body may be inserted into the inside of the first core body, wherein the second core body combines the coil assembly to the rotor tees.

In the rotor of a wound rotor driving motor in some forms of the present disclosure, the first core body may include walls integrally connecting both ends of the neighboring rotor shoes, wherein the walls are formed to protrude around a shaft of the second core body in the inner surface of the first core body.

In the rotor of a wound rotor driving motor in some forms of the present disclosure, the walls may be formed by dividing a space of the coil assembly in the inner surface of the first core body along a circumferential direction.

In the rotor of a wound rotor driving motor in some forms of the present disclosure, the wall may be formed as a triangular pyramid shape.

In the rotor of a wound rotor driving motor in some forms of the present disclosure, the wall may be formed as a wedge supporting the coil assembly.

In the rotor of a wound rotor driving motor in some forms of the present disclosure, the coil assembly may include a bobbin combined to a rotor tees of the second core body, and a rotor coil wound around the bobbin.

In the rotor of a wound rotor driving motor in some forms of the present disclosure, the coil assembly located close to each other may be insulated from the walls by a molding resin.

A rotor of a wound rotor driving motor in some forms of the present disclosure may include i) a first core body having an outer surface and an inner surface, and forming a space inside of the first core body, rotor shoes spaced apart at a predetermined space along a circumferential direction, and walls integrally connecting both ends of the rotor shoes inside of the first core body; ii) a second core body forming a shaft insertion hole at a center side of the second core body, rotor tees combined to an inner surface of the rotor shoes in a radial direction, and inserted into inside of the first core body; and iii) a coil assembly combined to the rotor tees of the second core body and disposed between the walls of the first core body.

In the rotor of a wound rotor driving motor in some forms of the present disclosure, the wall may be integrally formed at the first core body and as a wedge supporting the coil assemblies between them.

In the rotor of a wound rotor driving motor in some forms of the present disclosure, the coil assembly may include a bobbin combined to the rotor tees of the second core body, and a rotor coil wound around the bobbin.

In the rotor of a wound rotor driving motor in some forms of the present disclosure, the bobbin may include a bobbin body coupled to the rotor tees; a first bobbin flange integrally formed at end p of the bobbin body; and a second bobbin flange integrally formed at the other end of the bobbin body.

In the rotor of a wound rotor driving motor in some forms of the present disclosure, the first bobbin flange may be disposed at one end of the shaft insertion hole and formed to have a smaller width than the second bobbin flange.

In the rotor of a wound rotor driving motor in some forms of the present disclosure, the rotor coil of the coil assembly located close to each other may be insulated from the wall by a molding resin.

In some forms of the present disclosure, separate wedge assembled to a rotor core is not necessary, therefore number of entire motors may be reduced and component cost may be reduced. Further, in some forms of the present disclosure, a coil assembly in which a rotor coil is wound around a bobbin in advance is assembled to a second core body, and the second core body is assembled to a first core body. Accordingly, a winding operation of the rotor coil is easy and winding operation time may be relatively shortened.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
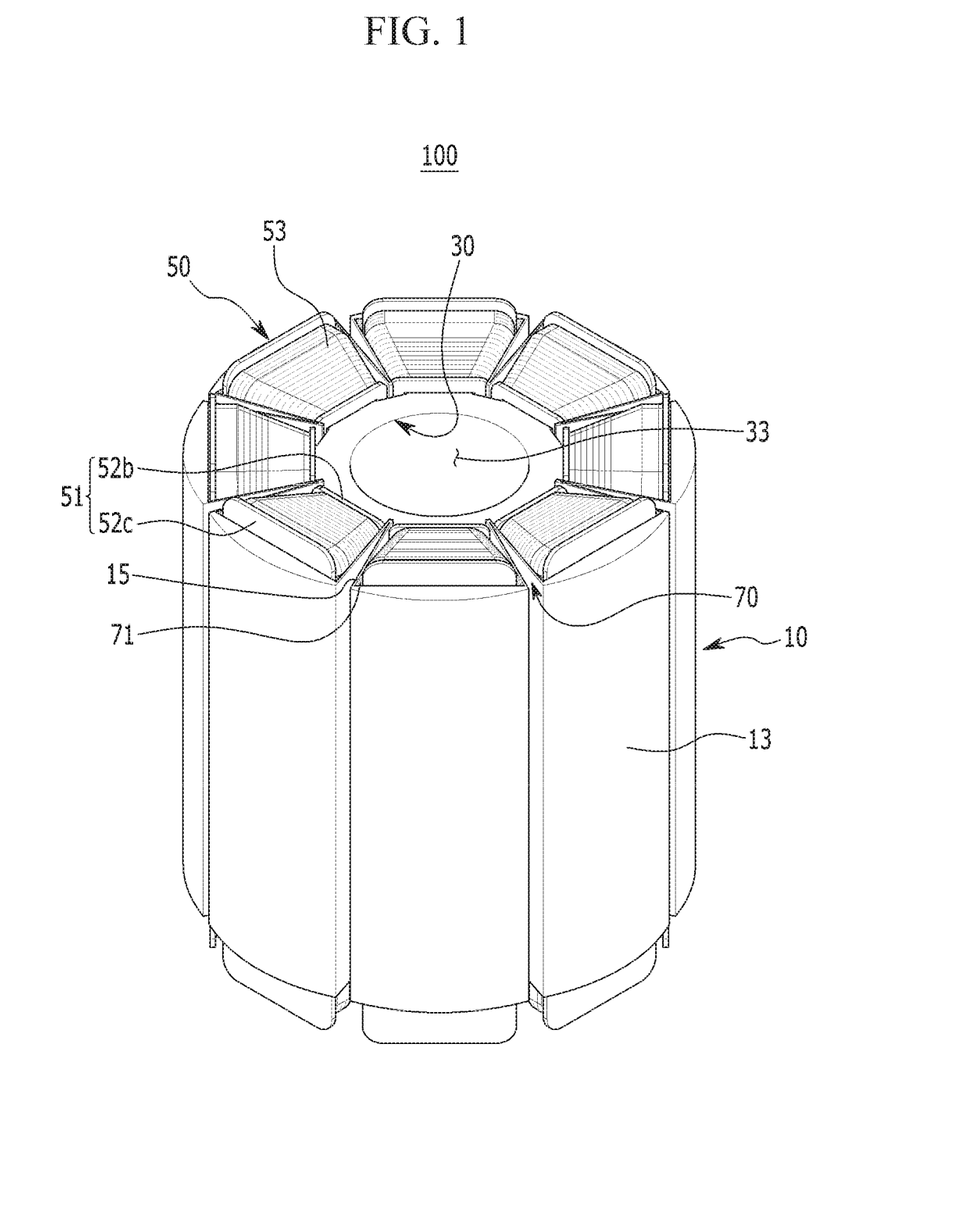
FIG. 1 is a combination perspective view illustrating a rotor of a wound rotor driving motor.
Figure 2:
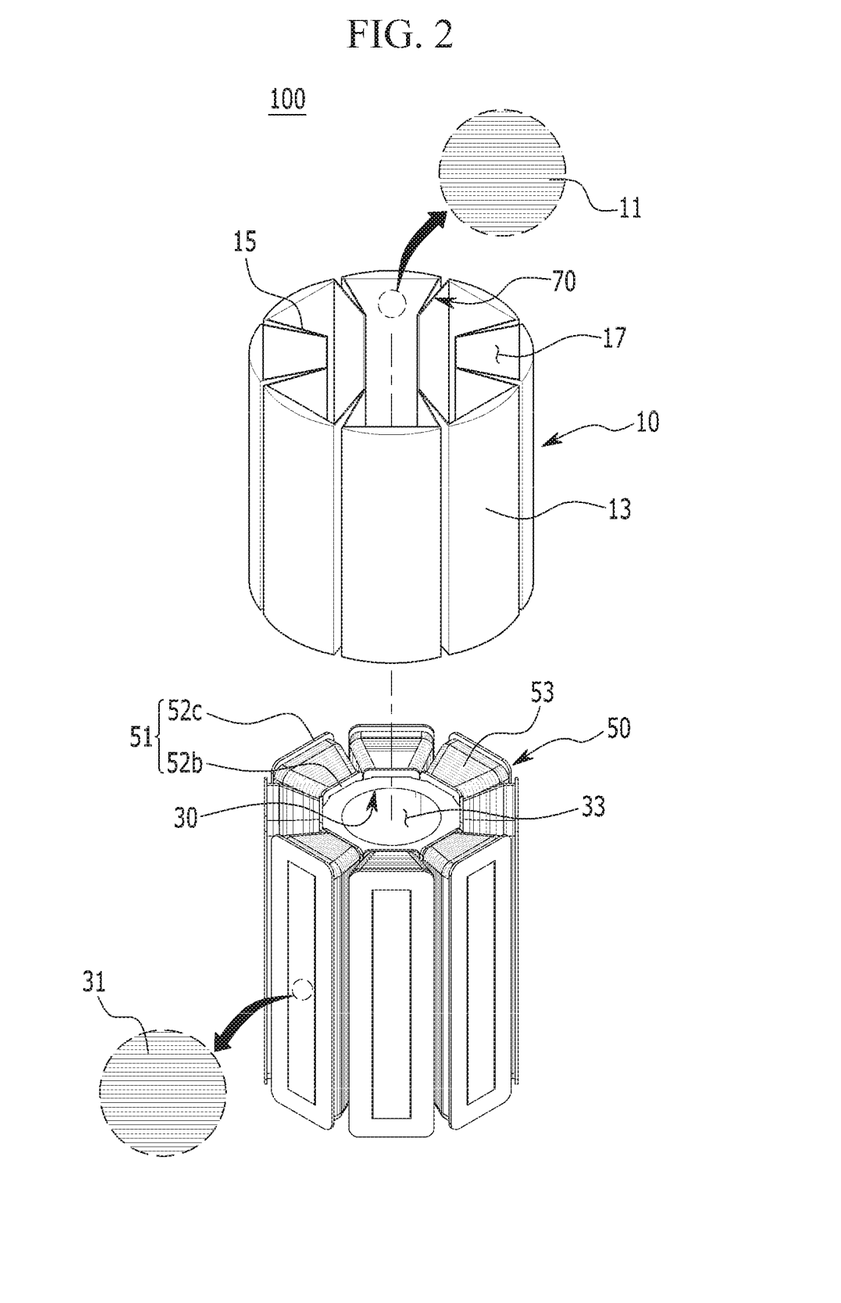
FIG. 2 is an expanded perspective view illustrating a rotor of a wound rotor driving motor.
Figure 3:
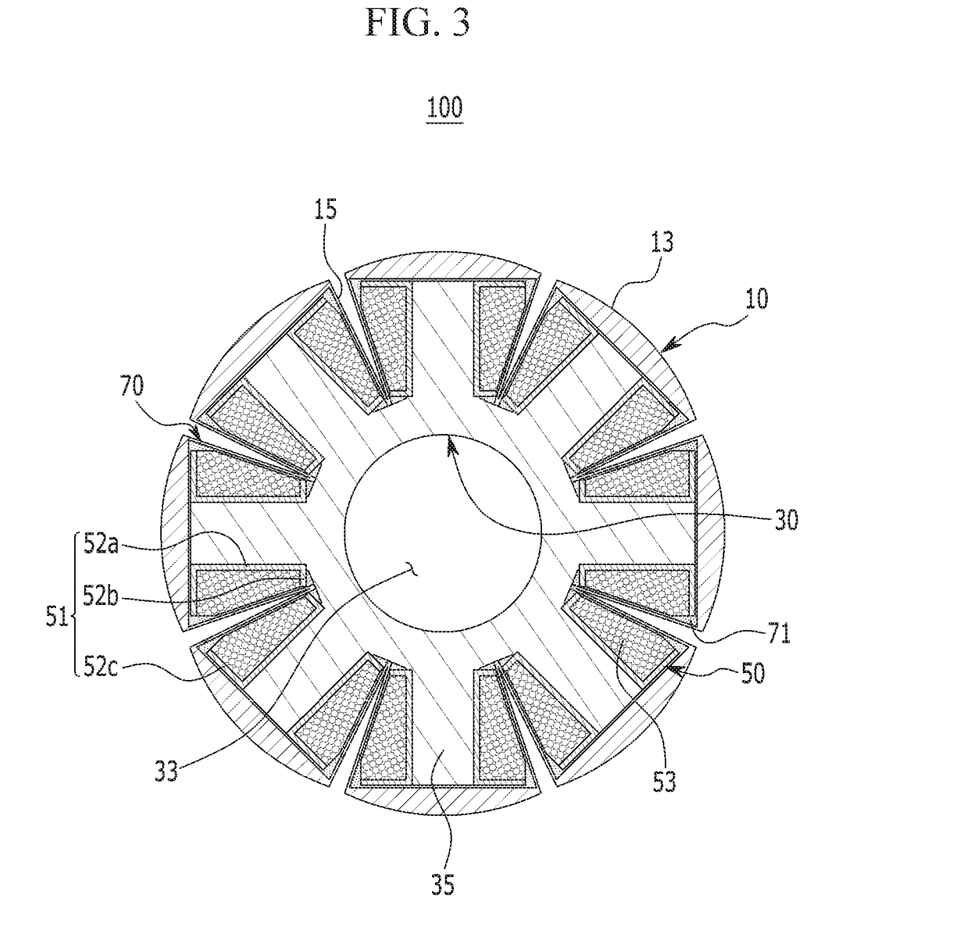
FIG. 3 is a combination cross-sectional view illustrating a rotor of a wound rotor driving motor.

FIG. 1 is a combination perspective view illustrating a rotor of a wound rotor driving motor in some forms of the present disclosure, FIG. 2 is an expanded perspective view illustrating a rotor of a wound rotor driving motor in some forms of the present disclosure, and FIG. 3 is a combination cross-sectional view illustrating a rotor of a wound rotor driving motor in some forms of the present disclosure.

Referring to FIG. 1 to FIG. 3, a rotor 100 of a wound rotor driving motor in some forms of the present disclosure is available for an electric power driving acquiring a driving force from electric energy in environmentally-friendly vehicles.

For example, the wound rotor driving motor includes a stator (not shown in drawings) around which a stator coil (not shown in drawings) is wound and a rotor 100 around which a coil is wound and disposed inside of the stator.

A rotation shaft (not shown in drawings) is combined to a center portion of the rotor 100, and the outer diameter surface of the rotor 100 disposed inside of the stator with a predetermined space from an inner diameter surface of the rotor 100.

Accordingly, the wound rotor driving motor, in which the rotor 100 is electromagnetized when current is applied, by winding coil around not only the stator, but the rotor 100, can generate a driving torque from the electromagnetic attractive force and a repulsive force between the electromagnet of the rotor 100 and the electromagnet of the stator.

A rotor 100 of wound rotor driving motor in some forms of the present disclosure is manufactured such that the rotor core is formed as heterogeneous division body and a wedge supporting the rotor core is integrally formed at the division body. As a result, this formation improves a winding operation ability and winding space factor.

A rotor 100 in some forms of the present disclosure basically include a first and second core bodies 10 and 30 as division body forming a rotor core, and a coil assembly 50 assembled to the rotor core.

In some forms of the present disclosure, the first core body 10 is a core division body assembled with the second core body 30, includes a plurality of laminated iron sheets 11, and has an exterior surface and interior surface and forms inside space. For example, the first core body 10 is formed as cylindrical shape where both ends are open.

Here, the outer surface of the first core body 10 includes an inner surface of the stator and an outer diameter surface facing with a predetermined space, and the inner surface includes a wall forming inside space.

The first core body 10 includes rotor shoes 13 connected with each other in a predetermined interval along a circumferential direction. The rotor shoe 13 is a cylindrical body of the first core, and face with the inner diameter surface of the stator with a predetermined space.

In addition, the first core body 10 integrally connects both ends of neighboring rotor shoes 13 and includes walls 15 configured to protrude around a shaft in an inner surface.

Here, the walls protrude around an inside shaft of the first core body 10 at each both ends of the rotor shoes 13 spaced apart in a predetermined interval along the circumferential direction of the first core body 10 and are connected with each other.

In other words, the walls 15 extend towards an inside of the first core body 10 at the both ends of the neighboring rotor shoe 13 and the walls are connected with each other. For example, the walls 15 are integrally formed at the first core body 10 as a triangular pyramid shape.

These walls 15 are spaced apart by a predetermined interval according to the rotor shoe 13 at inner surface of the first core body 10 and form insertion space 17 for inserting the coil assembly 50 being further described below along a circumferential direction of the inner surface.

In some forms of the present disclosure, the second core body 30 is a core division body and may include a plurality of laminated iron sheets 31. The second core body 30 may be inserted into inside of the first core body 10 and contacted with the inner surface of the first core body 10. The second core body 30 may be inserted inside of the first core body 10 in state of being combined with the coil assembly 50 being further described below.

The second core body 30 combines with the rotation shaft (not shown in drawings) and forms a shaft insertion hole 33 for inserting and fixing the rotation shaft at a center side in an axial direction.

Further, the second core body 30 forms rotor tees 35 being contacted with the rotor shoe 13 at the inner surface of the first core body 10 in a radial direction. The rotor tees 35 protrude in a radius direction of the hole around the insertion hole 33 and are spaced apart in a predetermined interval along a circumferential direction. This second core body 30 may be inserted into the inside of the first core body 10 in a state that the coil assembly 50 is combined to the rotor tees 35.

Here, the second core body 30 is inserted in to the inside of the first core body 10 and may form a slot between the rotor tees 35 since the rotor tees 35 contact at the inner surface of the rotor shoe 13. In this case, the walls 15 described above are disposed by crossing the slot between the rotor shoe 13 of the first core body 10.

Figure 4:
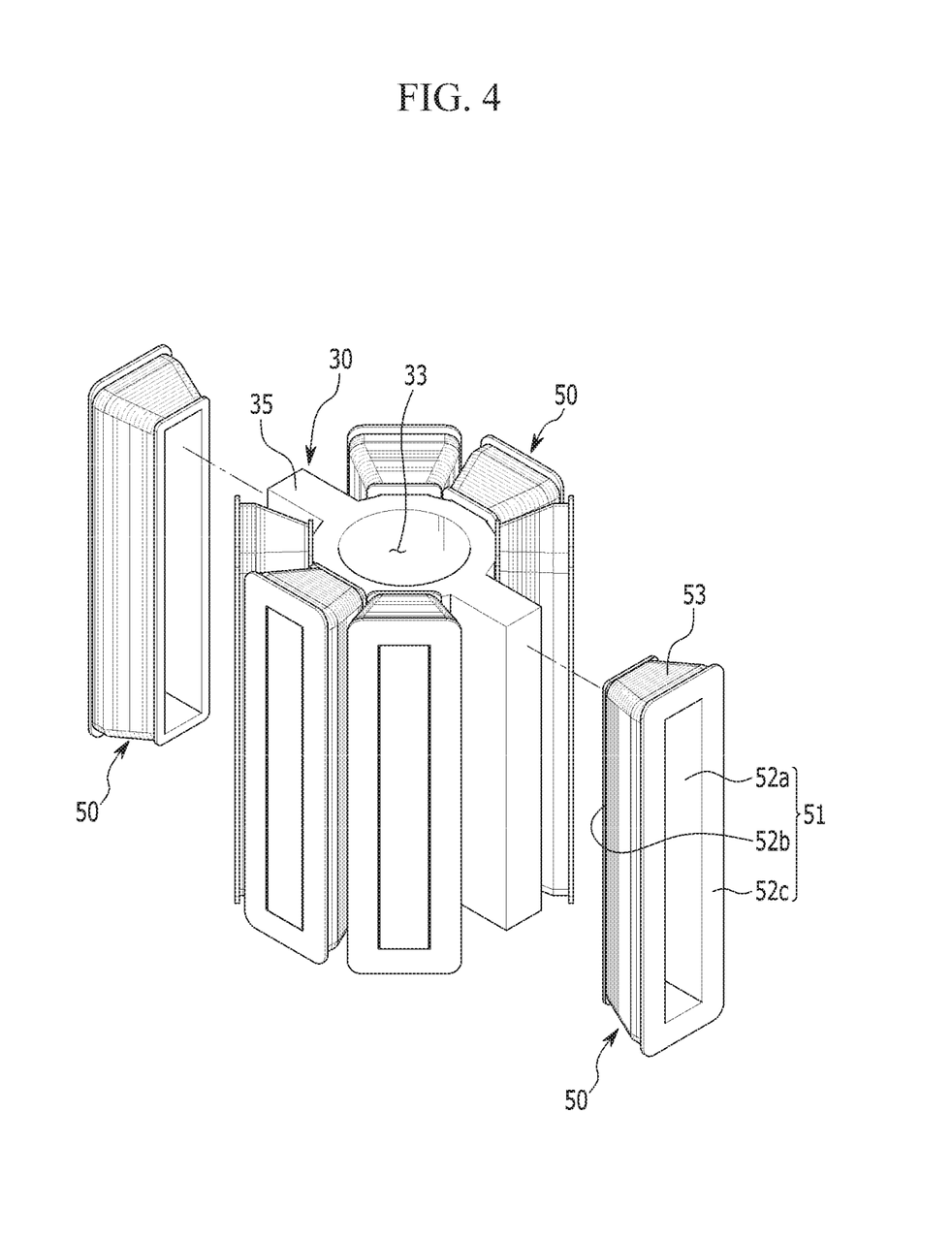
FIG. 4 is a drawing illustrating a combination structure of a coil assembly applied to a rotor of a wound rotor driving motor.

FIG. 4 is a drawing illustrating a combination structure of a coil assembly applied to a rotor of a wound rotor driving motor in some forms of the present disclosure.

Referring to the above figures and the FIG. 4, the coil assembly 50 in some forms of the present disclosure is combined with the second core body 30 in a radial direction before the first and second core bodies 10 and 30 are assembled. This coil assembly 50 includes a bobbin 51 combining with the second core body 30 and a rotor coil 53 wound around the bobbin 51.

The bobbin 51 supports the rotor coil 53 and is combined to the respective rotor tees 35 of the second core body 30. The bobbin 51 may be combined with the rotor tees 35 in a radius direction of the shaft insertion hole 33 and a contact end of the rotor tees 35 being contacted with the inner surface of the first core body 10 being exposed. Further, the rotor coil 53 is wound around the bobbin 51 by a nozzle-type winding device.

In addition, the bobbin 51 includes a bobbin body 51a, a first bobbin flange 52b and a second bobbin flange 52c. The rotor coil 53 is substantially wound around the bobbin body 52a, the bobbin body 52a is coupled to the rotor tees 35 in a radius direction of the shaft insertion hole 33, and both ends of the bobbin body 52a are open in the radius direction.

The first bobbin flange 52b supports one portion of the rotor coil 53 wound around the bobbin body 52a and a side of the shaft insertion hole 33 of the second core body 30, and is integrally formed at one side insertion end portion of the bobbin body 52a. Here, one end of the bobbin body 52a may be defined as an end portion of the side of the shaft insertion hole 33.

Further, the second bobbin flange 52c supports the other portion of the rotor coil 53 wound around the bobbin body 52a and dead-end of the rotor tees 35, and is integrally formed at the other end of the bobbin body 52a. Here, the other end of the bobbin body 52a may be defined as counterpart end portion of the one side insertion end portion of the bobbin body 52a.

In this case, the first bobbin flange 52b is disposed at the side of the shaft insertion hole 33 and has a smaller width than that of the second bobbin flange 52c. That is, the second bobbin flange 52c has a larger width than that of the first bobbin flange 52b.

The coil assembly 50 in some forms of the present disclosure may be combined with the rotor tees 35 of the second core body 30 by the bobbin 51 in a state that the rotor coil 53 is wound around the bobbin 51 by the nozzle-type winding device. Further, the second core body 30 may be inserted into the inside of the first core body 10 in a state that the coil assembly 50 is combined with the rotor tees 35.

Meanwhile, the coil assembly 50 may be inserted into the insertion space 17 between the walls 15 described above when the second core body 30 is inserted into the inside of the first core body 10 in a state that the coil assembly 50 is combined with the rotor tees 35 of the second core body 30.

Accordingly, the coil assembly 50 is positioned in the space 17 between the walls 15, and the walls 15 support the coil assembly 50. That s, the walls 15 may support the coil assembly 50 by positioning between the neighboring coil assemblies 50. Here, the walls are crossing the slot between the rotor tees 35, thereby positioning between the rotor shoe 13 of the first core body 10.

Accordingly, the walls 15 in some forms of the present disclosure are integrally formed at the first core body 10 and may be formed as wedges 70 supporting the coil assembly 50 between the coil assemblies 50.

In addition, in some forms of the present disclosure, the neighboring rotor coils 53 of the coil assembly 50 between the walls 15 may be insulated from the walls 15 by a molding resin 71.

Hereinafter, assembly process and interaction of rotor 100 of the wound rotor driving motor will be described more fully with reference to drawings disclosed above.

First, in some forms of the present disclosure, rotor shoes 13 connected with each other in a predetermined interval along a circumferential direction and a first core body 10 which integrally connects both ends of the neighboring rotor shoes 13, in which walls 15 is protruded around a shaft in an inner surface, and is cylindrical shape are described.

Further, in some forms of the present disclosure, a second core body 30 in which a shaft insertion hole 33 is formed at a center side and rotor tees 35 are formed in a radial direction along a radius direction of the hole is described.

In addition, in some forms of the present disclosure, a coil assembly 50 in which a rotor coil 53 is wound around a bobbin 51 is described. In some forms of the present disclosure, the coil assembly 50 may be provided by winding the rotor coil 53 around the bobbin 51 in a state that the bobbin 51 is installed at a nozzle-type winding device.

In this state, in some forms of the present disclosure, the coil assembly 50 is combined with the rotor tees 35 of the second core body 30 by the bobbin 51. Here, the coil assembly 50 is combined with the rotor tees 35 in a radius direction of the shaft insertion hole 33 by the bobbin 51, and an insertion end of the rotor tees 35 being inserted into the bobbin 51 is exposed outside.

In this case, the bobbin body 52a of the bobbin 51 supports outside of the rotor tees 35, the first bobbin flange 52b supports the side of the shaft insertion hole 33 of the second core body 30, and the second bobbin flange 52c supports the outside exposed end of the rotor tees 35.

Then, in some forms of the present disclosure, the second core body 30 is inserted into the inside of the first core body 10 in a state that the coil assembly 50 is combined with the rotor tees 35 of the second core body 30. Here, the coil assembly 50 is inserted into the insertion space 17 between the walls 15 inside of the first core body 10, and the rotor tees 35 of the second core body 30 are contacted with the rotor shoe 13 inside of the first core body 10.

Here, the walls 15 are disposed between the rotor tees 35, supports the coil assembly 50 between the neighboring coil assemblies 50, and are contacted with a side of the shaft insertion hole 33 of the second core body 30. In this state, in some forms of the present disclosure, a molding resin 71 is injected between the wall 15 and the coil assembly 50 and hardened.

In the rotor 100 of a wound rotor driving motor in some forms of the present disclosure, the coil assembly 50 may be supported by the walls 15 of the first core body 10 by inserting and assembling the second core body 30 combined with the coil assembly 50 with the first core body 10.

Accordingly, in some forms of the present disclosure, the walls 15 are integrally formed at the first core body 10, and the walls 15 functions as wedges 70 supporting the rotor coil 53 of the coil assembly 50. Therefore, mechanical strength supporting centrifugal force of the rotor coil 53 by the walls 15 may be gained.

Accordingly, in some forms of the present disclosure, separate wedge assembled to a rotor core is not necessary, therefore a number of entire motors may be reduced and the associated costs may be reduced.

In addition, in some forms of the present disclosure, the coil assembly 50 in which the rotor coil 53 is wound around the bobbin 51 in advance is assembled to the second core body 30, and the second core body 30 is assembled to the first core body 10. Accordingly, a winding operation of the rotor coil 53 becomes easy and a winding space factor of the rotor coil 53 in respect of the rotor core may be improved.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A rotor of a wound rotor driving motor, comprising:
   a first core body having an outer surface and an inner surface, wherein the first core body forms a space inside the first core body and has rotor shoes connected with each other at a predetermined space along a circumferential direction;
   a second core body forming a rotor tees, wherein the rotor tees contact with an inside of the rotor shoes in a radial direction and the second core body is inserted into an inside of the first core body; and
   a coil assembly combined to the rotor tees of the second core body,
   wherein the first core body is formed as an integral cylindrical shape and both ends of the first core body are open, and
   wherein the first core body comprises:
      walls integrally connecting both ends of the neighboring rotor shoes, wherein the walls are formed to protrude around a shaft of the second core body in the inner surface of the first core body.

2. The rotor of claim 1, wherein the second core body is inserted into the inside of the first core body, wherein the second core body combines the coil assembly to the rotor tees.

3. The rotor of claim 1, wherein the walls are formed by dividing a space of the coil assembly in the inner surface of the first core body along a circumferential direction.

4. The rotor of claim 1, wherein the walls are formed as a triangular pyramid shape.

5. The rotor of claim 1, wherein the walls are formed as a wedge supporting the coil assembly.

6. The rotor of claim 1, wherein the coil assembly comprises:
   a bobbin combined to a rotor tees of the second core body; and
   a rotor coil wound around the bobbin.

7. The rotor of claim 6, wherein the coil assembly located close to each other is insulated from the walls by a molding resin.

8. A rotor of a wound rotor driving motor comprising:
   a first core body, the first core body comprising:
      an outer surface and an inner surface;
      a space inside of the first core body;
      rotor shoes spaced apart at a predetermined space along a circumferential direction; and
      walls integrally connecting both ends of the rotor shoes inside of the first core body;
   a second core body, the second core body comprising:
      a shaft insertion hole at a center of the second core body; and
      rotor tees combined to an inner surface of the rotor shoes in a radial direction, and inserted into inside of the first core body; and
   a coil assembly, wherein the coil assembly is combined to the rotor tees of the second core body and disposed between the walls of the first core body, wherein the walls are integrally formed at the first core body and the walls are formed as a wedge supporting the coil assembly between the coil assembly.

9. The rotor of claim 8, wherein the coil assembly comprises:
a bobbin combined to the rotor tees of the second core body; and
a rotor coil wound around the bobbin.

10. The rotor of claim 9, wherein the bobbin comprises:
a bobbin body coupled to the rotor tees;
a first bobbin flange integrally formed at one end of the bobbin body; and
a second bobbin flange integrally formed at the other end of the bobbin body.

11. The rotor of claim 10, wherein the first bobbin flange is disposed at one end of the shaft insertion hole, wherein the first bobbin flange is formed to have a smaller width than the second bobbin flange.

12. The rotor of claim 9, wherein the rotor coil of the coil assembly located close to each other is insulated from the walls by a molding resin.

* * * * *